US012323067B2

(12) United States Patent
Fang et al.

(10) Patent No.: US 12,323,067 B2
(45) Date of Patent: Jun. 3, 2025

(54) CONTROL SYSTEMS AND METHODS FOR TURNING OFF TRANSISTORS ASSOCIATED WITH AUXILIARY WINDINGS AND TURNING ON TRANSISTORS ASSOCIATED WITH PRIMARY WINDINGS

(71) Applicant: ON-BRIGHT ELECTRONICS (SHANGHAI) CO., LTD., Shanghai (CN)

(72) Inventors: Qian Fang, Shanghai (CN); Yun Sun, Shanghai (CN); Penglin Yang, Shanghai (CN); Yuan Lin, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 236 days.

(21) Appl. No.: 17/949,762

(22) Filed: Sep. 21, 2022

(65) Prior Publication Data

US 2023/0099279 A1    Mar. 30, 2023

(30) Foreign Application Priority Data

Sep. 30, 2021 (CN) .......................... 202111166601.6

(51) Int. Cl.
*H02M 3/335* (2006.01)
(52) U.S. Cl.
CPC ... *H02M 3/33592* (2013.01); *H02M 3/33507* (2013.01); *H02M 3/33515* (2013.01)
(58) Field of Classification Search
CPC ......... H02M 3/33523; H02M 3/33592; H02M 3/33507; H02M 3/335
See application file for complete search history.

(56) References Cited

U.S. PATENT DOCUMENTS

2013/0329465 A1    12/2013  Hou et al.
2016/0087535 A1    3/2016   Hsiao et al.
(Continued)

FOREIGN PATENT DOCUMENTS

CN    108365766 A    8/2018
CN    111525801 A    8/2020
(Continued)

OTHER PUBLICATIONS

Taiwan Intellectual Property Office, Office Action issued Nov. 16, 2022, in Application No. 110142445.

*Primary Examiner* — Alex Torres-Rivera
(74) *Attorney, Agent, or Firm* — Faegre Drinker Biddle & Reath LLP

(57) ABSTRACT

System and method for controlling turning on a first transistor and turning off a second transistor. For example, a system for controlling turning on a first transistor and turning off a second transistor includes: a logic signal generator configured to: process information associated with a first voltage related to a second voltage of a first auxiliary winding, the first auxiliary winding being coupled to a primary winding, a secondary winding, and a second auxiliary winding; generate a third voltage based on at least information associated with the first voltage, the third voltage indicating a first voltage difference from a drain terminal to a source terminal of a first transistor related to the primary winding; process information associated with the third voltage and a reference voltage; and change a logic signal from a first logic level to a second logic level.

30 Claims, 8 Drawing Sheets

(56) References Cited

U.S. PATENT DOCUMENTS

2017/0302185 A1* 10/2017 Tao .................. H02M 3/33592
2018/0041132 A1* 2/2018 Fang ................. H02M 3/33507

FOREIGN PATENT DOCUMENTS

| CN | 111711345 A | 9/2020 |
| CN | 112701882 A | 4/2021 |
| CN | 112994470 A | 6/2021 |
| CN | 113131746 A | 7/2021 |
| TW | 201944712 A | 11/2019 |
| TW | 202023171 A | 6/2020 |

* cited by examiner

CONTROL SYSTEMS AND METHODS FOR TURNING OFF TRANSISTORS ASSOCIATED WITH AUXILIARY WINDINGS AND TURNING ON TRANSISTORS ASSOCIATED WITH PRIMARY WINDINGS

1. CROSS-REFERENCES TO RELATED APPLICATIONS

This application claims priority to Chinese Patent Application No. 202111166601.6, filed Sep. 30, 2021, incorporated by reference herein for all purposes.

2. BACKGROUND OF THE INVENTION

Certain embodiments of the present invention are directed to circuits. More particularly, some embodiments of the invention provide control systems and methods for turning off transistors associated with auxiliary windings and turning on transistors associated with primary windings. Merely by way of example, some embodiments of the invention have been applied to switch-mode power converters. But it would be recognized that the invention has a much broader range of applicability.

Power converters are widely used for consumer electronics such as portable devices. The power converters often can convert electric power from one form to another form. As an example, the electric power is transformed from alternate current (AC) to direct current (DC), from DC to AC, from AC to AC, and/or from DC to DC. For example, the power converters can convert the electric power from one voltage level to another voltage level.

Often the power converters are switch-mode converters. The switch-mode converters usually are implemented with a fly-back architecture, a buck architecture, and/or a boost architecture. For example, a switch-mode converter includes an electromagnetic-interference (EMI) filter circuit, a rectifier filter circuit, a power conversion circuit, a pulse-width-modulation (PWM) control circuit, and/or an output rectifier filter circuit. As an example, the PWM control circuit is implemented as a PWM controller chip.

FIG. 1 is a simplified diagram showing a conventional quasi-resonant switch-mode power converter. The quasi-resonant switch-mode power converter 100 includes a primary winding 112, a secondary winding 114, auxiliary windings 116 and 118, a controller chip 120, resistors 140, 142 and 144, transistors 150 and 160, a capacitor 162, an optocoupler 172, a shunt regulator 174 (e.g., TL431), and a capacitor 176. For example, the controller chip 120 includes a demagnetization detector 132, a timer 134, a comparator 136, and a flip flop 138. As an example, the transistor 150 includes a parasitic capacitor 152. For example, the primary winding 112, the secondary winding 114, and the auxiliary windings 116 and 118 are parts of a transformer.

As shown in FIG. 1, the power converter 100 receives an AC input voltage 190 and generates an output voltage 192. Based at least in part on the output voltage 192, a feedback circuit, which includes the optocoupler 172, the shunt regulator 174 (e.g., TL431) and the capacitor 176, generates a feedback voltage 173. The feedback voltage 173 is used to turn off the transistor 150, which is connected to the primary winding 112. After the transistor 150 becomes turned off, the capacitor 162 connected to the auxiliary winding 118 is charged, and the secondary winding 114 undergoes a demagnetization process, during which a current 115 flows through the secondary winding 114. In response to the demagnetization, the auxiliary winding 116 generates a voltage 117, which is received by a voltage divider that includes the resistors 140 and 142. The voltage divider generates a voltage 141 based at least in part on the voltage 117. Using the voltage 141, the demagnetization detector 132 detects the end of the demagnetization process of the secondary winding 114. At the end of the demagnetization process of the secondary winding 114, the transistor 160, which is connected to the auxiliary winding 118, becomes turned on. When the transistor 160 is turned on, the capacitor 162 discharges to generate a current 163 that flows from the capacitor 162 through the auxiliary winding 118 to the transistor 160, causing a voltage difference across the capacitor 162 to reduce.

A predetermined duration of time after the transistor 160 becomes turned on, the transistor 160 becomes turned off. The predetermined duration of time represents the time duration during which the transistor 160 remains turned on, and the predetermined duration of time is constant. The turning off of the transistor 160 creates an open circuit for the current 163 and causes a current 113 to flow from the transistor 150 to the primary winding 112. The current 113 is used to discharge the parasitic capacitor 152 of the transistor 150, wherein the voltage across the parasitic capacitor 152 represents a voltage difference from the drain terminal of the transistor 150 to the source terminal of the transistor 150. The voltage difference from the drain terminal of the transistor 150 to the source terminal of the transistor 150 is equal to the voltage at the drain terminal of the transistor 150 minus the voltage at the source terminal of the transistor 150. After a predetermined delay from the time when the transistor 160 becomes turned off, the transistor 150 becomes turned on. For example, when the transistor 160 becomes turned off, the resonance process for the primary winding 112 and the capacitor 152 starts. As an example, if the predetermined delay is equal to about one quarter of the resonance period, the transistor 150 becomes turned on when the voltage difference from the drain terminal of the transistor 150 to the source terminal of the transistor 150 is close to zero volts.

As shown in FIG. 1, the demagnetization detector 132 receives the voltage 141 and generates a signal 133 based at least in part on the voltage 141. When the demagnetization detector 132 detects the end of the demagnetization process of the secondary winding 114, the demagnetization detector 132 changes the signal 133 from a logic low level to a logic high level. The signal 133 is received by the timer 134, which in response generates signals 135 and 139. For example, if the signal 133 changes from the logic low level to the logic high level, the signal 135 also changes from the logic low level to the logic high level and remains at the logic high level for the predetermined duration of time, and after the predetermined duration of time has passed, the signal 135 changes from the logic high level to the logic low level in order to turn off the transistor 160. As an example, immediately after the signal 135 changes from the logic high level to the logic low level, the signal 139 still remains at the logic low level, and during the predetermined delay from the time when the signal 135 changes from the logic high level to the logic low level, both the signal 135 and the signal 139 are at the logic low level. After the predetermined delay from the time when the signal 135 changes from the logic high level to the logic low level, the signal 139 changes from the logic low level to the logic high level.

When the transistor 150 is turned on, the current 113 flows from the primary winding 112 through the transistor 150 to the resistor 144, generating a voltage 145. The voltage 145 is received by a non-inverting input terminal (e.g., the "+"

terminal) of the comparator 136, which also receives the feedback voltage 173 at an inverting input terminal (e.g., the "−" terminal). In response, the comparator 136 generates a comparison signal 137. The flip flop receives the signal 139 at an S input terminal and the signal 137 at an R input terminal and generates a signal 151 at a Q output terminal. If the signal 139 changes from the logic low level to the logic high level, the signal 151 changes from the logic low level to the logic high level in order to turn on the transistor 150. If the signal 137 changes from the logic low level to the logic high level, the signal 151 changes from the logic high level to the logic low level in order to turn off the transistor 150. During the predetermined delay from the time when the signal 135 changes from the logic high level to the logic low level, both the signal 135 and the signal 151 are at the logic low level, and both the transistor 150 and the transistor 160 are turned off.

Hence it is highly desirable to improve the technique for power converters.

3. BRIEF SUMMARY OF THE INVENTION

Certain embodiments of the present invention are directed to circuits. More particularly, some embodiments of the invention provide control systems and methods for turning off transistors associated with auxiliary windings and turning on transistors associated with primary windings. Merely by way of example, some embodiments of the invention have been applied to switch-mode power converters. But it would be recognized that the invention has a much broader range of applicability.

According to some embodiments, a system for controlling turning on a first transistor and turning off a second transistor includes: a logic signal generator configured to: process information associated with a first voltage related to a second voltage of a first auxiliary winding, the first auxiliary winding being coupled to a primary winding, a secondary winding, and a second auxiliary winding; generate a third voltage based on at least information associated with the first voltage, the third voltage indicating a first voltage difference from a drain terminal to a source terminal of a first transistor related to the primary winding; process information associated with the third voltage and a reference voltage; and change a logic signal from a first logic level to a second logic level based at least in part on the second voltage and the reference voltage; and a drive signal generator configured to: receive the logic signal; and in response to the logic signal changing from the first logic level to the second logic level, change, at a first time, a first drive signal to turn off a second transistor related to the second auxiliary winding; and change, at a second time, a second drive signal to turn on the first transistor related to the primary winding, the second time being after the first time by a predetermined delay.

According to some embodiments, a method for controlling turning on a first transistor and turning off a second transistor includes: processing information associated with a first voltage related to a second voltage of a first auxiliary winding, the first auxiliary winding being coupled to a primary winding, a secondary winding, and a second auxiliary winding; generating a third voltage based on at least information associated with the first voltage, the third voltage indicating a first voltage difference from a drain terminal to a source terminal of a first transistor related to the primary winding; processing information associated with the third voltage and a reference voltage; changing a logic signal from a first logic level to a second logic level based at least in part on the second voltage and the reference voltage;

receiving the logic signal; and in response to the logic signal changing from the first logic level to the second logic level, changing, at a first time, a first drive signal to turn off a second transistor related to the second auxiliary winding; and changing, at a second time, a second drive signal to turn on the first transistor related to the primary winding, the second time being after the first time by a predetermined delay.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide control systems and methods for turning off transistors associated with auxiliary windings and turning on transistors associated with primary windings. Merely by way of example, some embodiments of the invention have been applied to switch-mode power converters. But it would be recognized that the invention has a much broader range of applicability.

Figure 1:
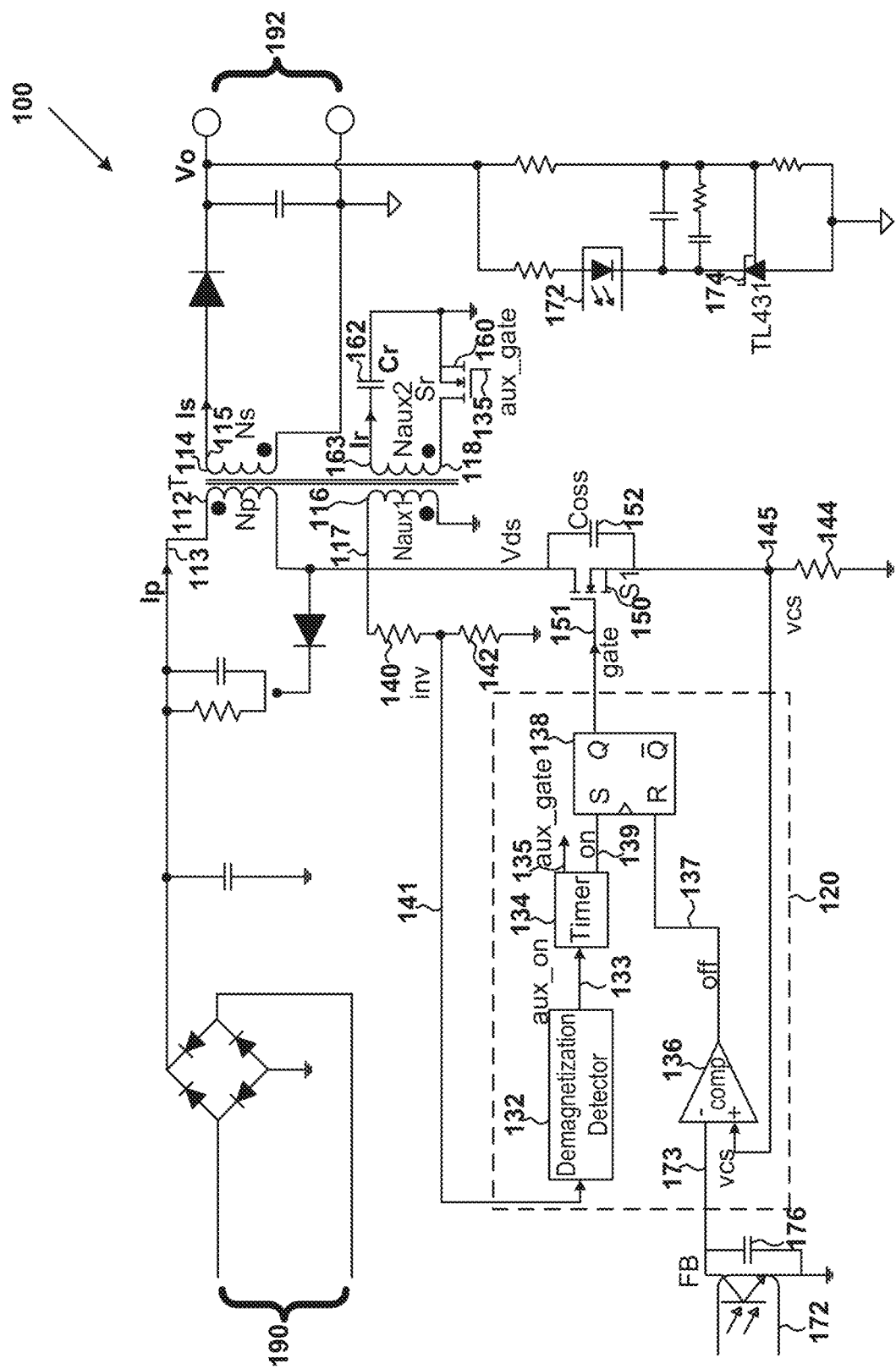
FIG. 1 is a simplified diagram showing a conventional quasi-resonant switch-mode power converter.
Figure 2:
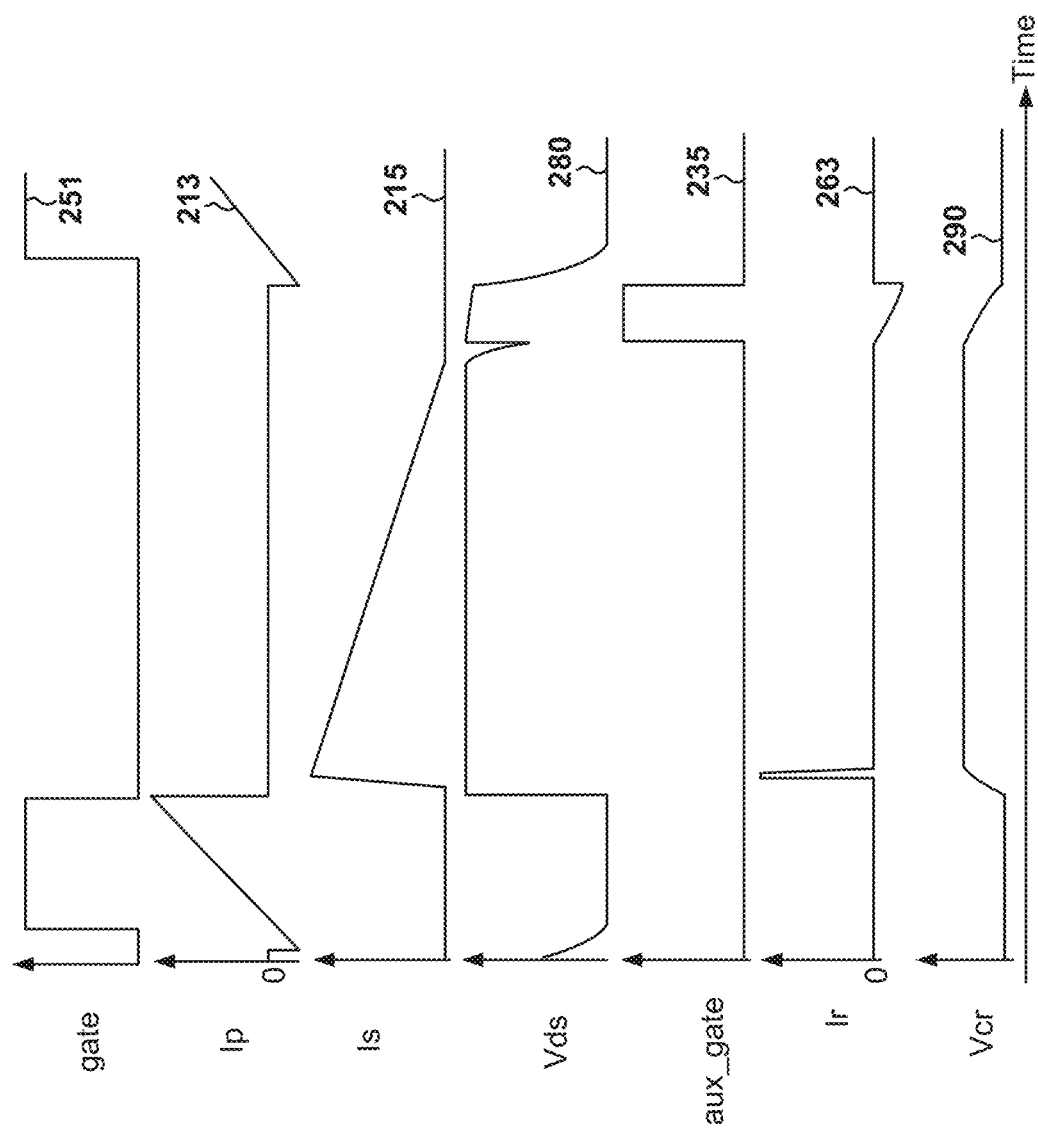
FIG. 2 shows simplified timing diagrams for the quasi-resonant switch-mode power converter as shown in FIG. 1 according to certain embodiments.

FIG. 2 shows simplified timing diagrams for the quasi-resonant switch-mode power converter 100 as shown in FIG. 1 according to certain embodiments. For example, the waveform 251 represents the signal 151 as a function of time, the waveform 213 represents the current 113 as a function of time, the waveform 215 represents the current 115 as a function of time, the waveform 235 represents the signal 135 as a function of time, and the waveform 263 represents the current 163 as a function of time. Additionally, the waveform 280 represents the voltage difference from the drain terminal of the transistor 150 to the source terminal of the transistor 150 as a function of time, and the waveform 290 represents the voltage difference across the capacitor 162 as a function of time.

For example, as shown by the waveform 213, if the current 113 is larger than zero, the current 113 flows from the primary winding 112 to the transistor 150, and if the current 113 is smaller than zero, the current 113 flows from the transistor 150 to the primary winding 112 as shown in FIG. 1. As an example, as shown by the waveform 263, if the current 163 is larger than zero, the current 163 flows from the body diode of the transistor 160, through the auxiliary winding 118, to the capacitor 162, and if the current 163 is smaller than zero, the current 163 flows from the capacitor 162 through the auxiliary winding 118 to the transistor 160 as shown in FIG. 1.

In some embodiments, as shown by the waveforms 251 and 213, after the transistor 150 becomes turned on, the current 113 flows from the primary winding 112 to the transistor 150 with an increasing current magnitude when the transistor 150 remains turned on. In certain examples, after the transistor 150 becomes turned off, the current magnitude of the current 113 decreases to zero as shown by the waveform 213, and the capacitor 162 connected to the auxiliary winding 118 is charged as shown by the waveforms 263 and 290. For example, as shown by the waveforms 263 and 290, if the voltage difference across the capacitor 162 reaches $$V_o \times \frac{N_{aux2}}{N_s},$$

the current 163 reduces to zero such that the voltage difference across the capacitor 162 remains equal to $$V_o \times \frac{N_{aux2}}{N_s},$$

wherein $V_o$ represents the output voltage 192, $N_{aux2}$ represents the number of turns of the auxiliary winding 118, and $N_s$ represents the number of turns of the secondary winding 114. As an example, as shown by the waveforms 263 and 215, if the voltage difference across the capacitor 162 reaches $$V_o \times \frac{N_{aux2}}{N_s},$$

the current 163 reduces to zero such that the voltage difference across the capacitor 162 remains equal to $$V_o \times \frac{N_{aux2}}{N_s},$$

wherein $V_o$ represents the output voltage 192, $N_{aux2}$ represents the number of turns of the auxiliary winding 118, and $N_s$ represents the number of turns of the secondary winding 114. In some examples, after the transistor 150 becomes turned off, the current magnitude of the current 113 decreases to zero and the secondary winding 114 starts undergoing the demagnetization process as shown by the waveforms 213 and 215. For example, the demagnetization process ends when the current 115 reduces to zero as shown by the waveform 215. As an example, at the end of the demagnetization process of the secondary winding 114, the transistor 160 becomes turned on, causing the capacitor 162 discharges to generate the current 163 that flows from the capacitor 162 through the auxiliary winding 118 to the transistor 160 and cause the voltage difference across the capacitor 162 to reduce as shown by the waveforms 235, 263, and 290.

In certain embodiments, after the predetermined duration of time after the transistor 160 becomes turned on, the transistor 160 becomes turned off. In some examples, when the transistor 160 becomes turned off, the current magnitude of the current 163 reduces to zero and the current 113 flows from the transistor 150 to the primary winding 112 in order to discharge the capacitor 152. As an example, with the discharging of the capacitor 152, the voltage difference from the drain terminal of the transistor 150 to the source terminal of the transistor 150 decreases. In certain example, after the predetermined delay from the time when the transistor 160 becomes turned off, when the voltage difference from the drain terminal of the transistor 150 to the source terminal of the transistor 150 has been reduced, the transistor 150 becomes turned on as shown by the waveforms 251 and 280.

As shown in FIG. 1, for the quasi-resonant switch-mode power converter 100, the predetermined duration of time, during which the transistor 160 remains turned on, determines the maximum current magnitude of the current 163 that flows from the capacitor 162 through the auxiliary winding 118 to the transistor 160 and also determines the magnitude of the resonance energy after the transistor 160 becomes turned off according to some embodiments. For example, from the time when the transistor 160 becomes turned off, after the predetermined delay, the transistor 150 becomes turned on. As an example, the predetermined duration of time, during which the transistor 160 remains turned on, further determines the voltage difference from the drain terminal of the transistor 150 to the source terminal of the transistor 150 immediately before the transistor 150 becomes turned on.

As shown in FIG. 2, when the secondary winding undergoes the demagnetization process, the voltage difference from the drain terminal of the transistor 150 to the source terminal of the transistor 150 changes with the AC input voltage 190 according to certain embodiments. For example, if, before the resonance process, the voltage difference from the drain terminal of the transistor 150 to the source terminal of the transistor 150 changes, the duration of time, during which the transistor 160 remains turned on, also needs to change in order to reduce the voltage difference after the predetermined delay immediately before the transistor 150 becomes turned on. As an example, the duration of time, during which the transistor 160 remains turned on, needs to change with the AC input voltage 190.

In some examples, if the duration of time, during which the transistor 160 remains turned on, is too short, the voltage difference immediately before the transistor 150 becomes turned on would be too high, leading to significant energy loss caused by the change of the transistor 150 from being turned off to turned on. In certain examples, if the duration of time, during which the transistor 160 remains turned on, is too long, the maximum current magnitude of the current 163 that flows from the capacitor 162 through the auxiliary winding 118 to the transistor 160 would be too large, leading to significant energy loss when the transistor 160 remains turned on. For example, if the duration of time, during which the transistor 160 remains turned on, is too long, another duration of time, during which the current magnitude of the current 113 that flows from the transistor 150 to the primary winding 112 is larger than zero, becomes too long, causing the root-mean-square (rms) magnitude of the current 113 during this another duration of time to become too large and also leading to significant energy loss when the transistor 150 is turned on.

According to some embodiments, the duration of time, during which the transistor 160 remains turned on, is not too short and is not too long. As an example, the voltage difference from the drain terminal of the transistor 150 to the source terminal of the transistor 150 is equal to about 50 volts immediately before the transistor 150 becomes turned, leading to improved energy efficiency when the transistor 150 changes from being turned off to turned on.

Figure 3:
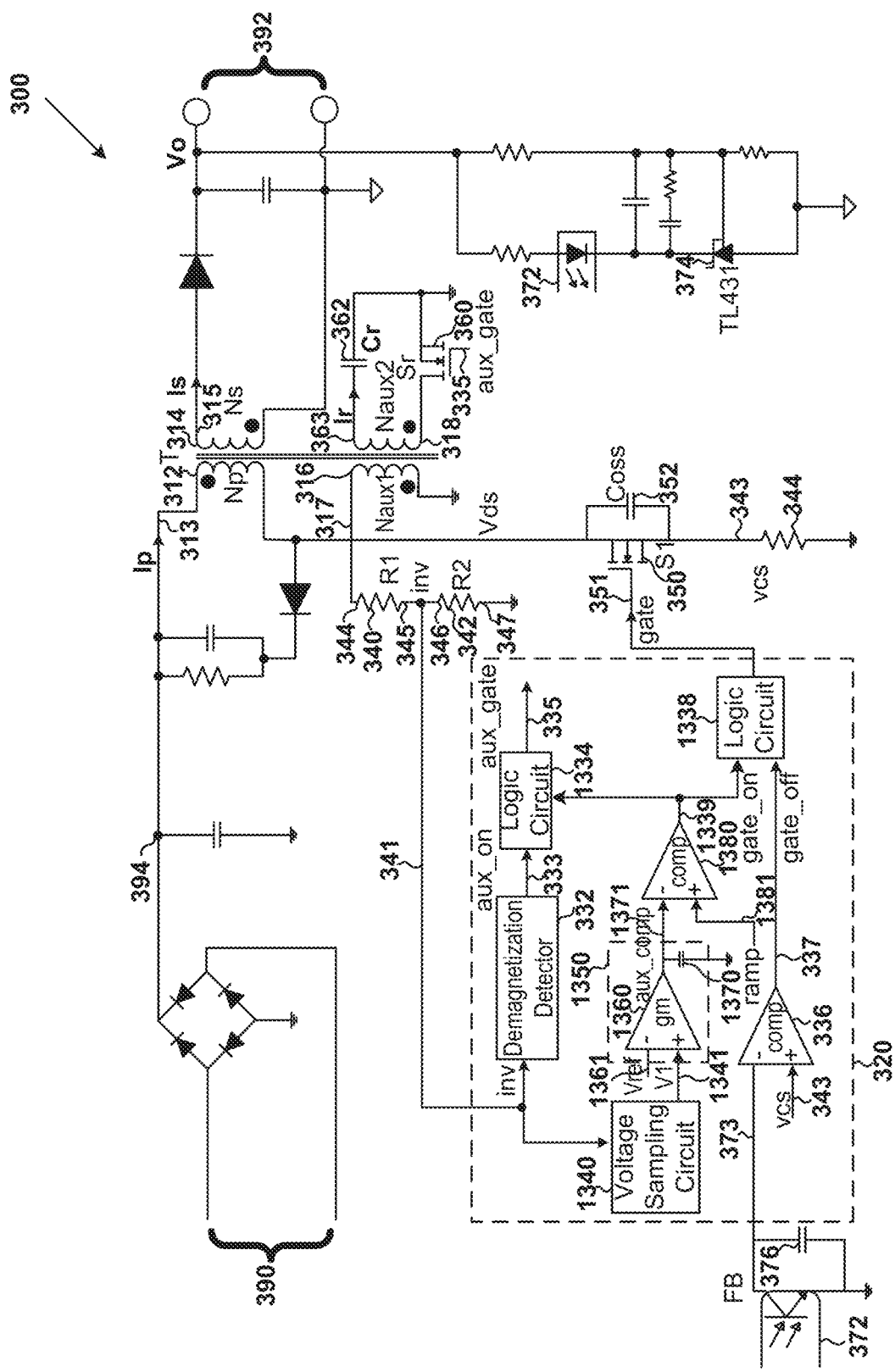
FIG. 3 is a simplified diagram showing a quasi-resonant switch-mode power converter according to certain embodiments of the present invention.

FIG. 3 is a simplified diagram showing a quasi-resonant switch-mode power converter according to certain embodiments of the present invention. This diagram is merely an example, which should not unduly limit the scope of the claims. One of ordinary skill in the art would recognize many variations, alternatives, and modifications. The quasi-resonant switch-mode power converter 300 includes a primary winding 312, a secondary winding 314, auxiliary windings 316 and 318, a controller chip 320, resistors 340, 342 and 344, transistors 350 and 360, a capacitor 362, an optocoupler 372, a shunt regulator 374 (e.g., TL431), and a capacitor 376. Additionally, the controller chip 320 includes a demagnetization detector 332, a comparator 336, a voltage sampling circuit 1340, an integrator circuit 1350, a comparator 1380, a logic circuit 1334, and a logic circuit 1338. For example, the integrator circuit 1350 includes a transconductance amplifier 1360, a capacitor 1370. As an example, the transistor 350 includes a parasitic capacitor 352. Although the above has been shown using a selected group of components for the quasi-resonant switch-mode power converter 300, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some examples, the primary winding 312, the secondary winding 314, and the auxiliary windings 316 and 318 are parts of a transformer. For example, the primary winding 312, the secondary winding 314, the auxiliary winding 316, and the auxiliary winding 318 are coupled to each other. In certain examples, the voltage sampling circuit 1340, the integrator circuit 1350, and the comparator 1380 are parts of a logic signal generator. For example, the logic signal generator outputs a comparison signal 1339. As an example, the comparison signal 1339 is a logic signal. In some examples, the logic circuit 1334 and the logic circuit 1338 are parts of a drive signal generator, which generates signals 335 and 351. For example, the signal 335 is used as a drive signal to turn on and/or turn off the transistor 360. As an example, the signal 351 is used as a drive signal to turn on and/or turn off the transistor 350.

As shown in FIG. 3, the power converter 300 receives an AC input voltage 390 and generates an output voltage 392 that is associated with the secondary winding 314 according to some embodiments. For example, based at least in part on the output voltage 392, a feedback circuit, which includes the optocoupler 372, the shunt regulator 374 (e.g., TL431) and the capacitor 376, generates a feedback voltage 373 that is related to the output voltage 392. As an example, the feedback voltage 373 is used to turn off the transistor 350, which is connected to the primary winding 312. In certain examples, after the transistor 350 becomes turned off, the capacitor 362 connected to the auxiliary winding 318 is charged, and the secondary winding 314 undergoes a demagnetization process, during which a current 315 flows through the secondary winding 314. For example, in response to the demagnetization, the auxiliary winding 316 generates a voltage 317. In some examples, the resistor 340 includes terminals 344 and 345, and the resistor 342 includes terminals 346 and 347. For example, the terminal 344 of the resistor 340 receives the voltage 317, and the terminal 347 of the resistor 342 is biased to a ground voltage. As an example, the terminal 345 of the resistor 340 and the terminal 346 of the resistor 342 are connected to generate a voltage 341 based at least in part on the voltage 317.

In certain embodiments, using the voltage 341, the demagnetization detector 332 detects the end of the demagnetization process of the secondary winding 314. For example, at the end of the demagnetization process of the secondary winding 314, the transistor 360, which is connected to the auxiliary winding 318, becomes turned on. As an example, when the transistor 360 is turned on, the capacitor 362 discharges to generate a current 363 that flows from the capacitor 362 through the auxiliary winding 318 to the transistor 360, causing a voltage difference across the capacitor 362 to reduce.

In some embodiments, a duration of time after the transistor 360 becomes turned on, the transistor 360 becomes turned off. For example, the duration of time represents the time duration during which the transistor 360 remains turned on. As an example, the turning off of the transistor 360 creates an open circuit for the current 363 and causes a current 313 to flow from the transistor 350 to the primary winding 312. In some examples, the current 313 is used to discharge the parasitic capacitor 352 of the transistor 350, wherein the voltage across the parasitic capacitor 352 represents a voltage difference from the drain terminal of the transistor 350 to the source terminal of the transistor 350. For example, the voltage difference from the drain terminal of the transistor 350 to the source terminal of the transistor 350 is equal to the voltage at the drain terminal of the transistor 350 minus the voltage at the source terminal of the transistor 350. As an example, after a predetermined delay from the time when the transistor 360 becomes turned off, the transistor 350 becomes turned on. In certain examples, when the transistor 360 becomes turned off, the resonance process for the primary winding 312 and the capacitor 352 starts. For example, if the predetermined delay is equal to about one quarter of the resonance period, the transistor 350 becomes turned on when the voltage difference from the drain terminal of the transistor 150 to the source terminal of the transistor 150 is equal to a predetermined voltage (e.g., the reference voltage 1361). As an example, the primary winding 312 receives a voltage 394.

In certain embodiments, as shown in FIG. 3, the demagnetization detector 332 receives the voltage 341 and generates a signal 333 based at least in part on the voltage 341. For example, when the demagnetization detector 332 detects the end of the demagnetization process of the secondary winding 314, the demagnetization detector 332 changes the signal 333 from a logic low level to a logic high level. As an example, the signal 333 is received by the logic circuit 1334, which generates a signal 335 based at least in part on the signal 333. In some examples, when the transistor 350 is turned on, the current 313 flows from the primary winding 312 through the transistor 350 to the resistor 344, generating a voltage 343. For example, the voltage 343 is received by a non-inverting input terminal (e.g., the "+" terminal) of the comparator 336, which also receives the feedback voltage 373 at an inverting input terminal (e.g., the "−" terminal). In certain examples, in response, the comparator 336 generates a comparison signal 337. For example, if the voltage 343 becomes larger than the feedback voltage 373, the comparison signal 337 changes from the logic low level to the logic high level. As an example, the comparison signal 337 is received by the logic circuit 1338, which generates a signal 351 based at least in part on the comparison signal 337.

According to some embodiments, the voltage sampling circuit 1340 receives the voltage 341 and generates a sampled difference voltage 1341. For example, the voltage sampling circuit 1340 samples the voltage 341 immediately before the transistor 350 becomes turned on to generate a first sample voltage, and the voltage sampling circuit 1340 also samples the voltage 341 after the transistor 350 becomes turned on but before the transistor 350 becomes turned off again to generate a second sample voltage. As an example, the voltage sampling circuit 1340 generates the sampled difference voltage 1341 that is equal to the first sample voltage minus the second sample voltage. In some examples, the first sampled voltage is directly proportional to the voltage 394 minus a voltage difference from the drain terminal of the transistor 350 to the source terminal of the transistor 350 immediately before the transistor 350 becomes turned on, and the second sampled voltage is directly proportional to the voltage 394 minus the voltage difference from the drain terminal of the transistor 350 to the source terminal of the transistor 350 after the transistor 350 becomes turned on but before the transistor 350 becomes turned off again.

In certain examples, the sampled difference voltage 1341 represents a change in the voltage difference from the drain terminal of the transistor 350 to the source terminal of the transistor 350 between a first time immediately before the transistor 350 becomes turned on and a second time after the transistor 350 becomes turned on but before the transistor 350 becomes turned off again. For example, the sampled difference voltage 1341 represents the voltage difference from the drain terminal to the source terminal of the transistor 350 immediately before the transistor 350 becomes turned on minus the voltage difference from the drain terminal to the source terminal of the transistor 350 after the transistor 350 becomes turned on but before the transistor 350 becomes turned off again. As an example, the sampled difference voltage 1341 is directly proportional to the voltage difference from the drain terminal to the source terminal of the transistor 350 immediately before the transistor 350 becomes turned on minus the voltage difference from the drain terminal to the source terminal of the transistor 350 after the transistor 350 becomes turned on but before the transistor 350 becomes turned off again.

In some examples, the voltage difference from the drain terminal to the source terminal of the transistor 350 after the transistor 350 becomes turned on but before transistor 350 becomes turned off again is equal to zero volts, and the sampled difference voltage 1341 represents the voltage difference from the drain terminal of the transistor 350 to the source terminal of the transistor 350 immediately before the transistor 350 becomes turned on. For example, the voltage difference from the drain terminal to the source terminal of the transistor 350 after the transistor 350 becomes turned on but before transistor 350 becomes turned off again is equal to zero volts, and the sampled difference voltage 1341 is directly proportional to the voltage difference from the drain terminal of the transistor 350 to the source terminal of the transistor 350 immediately before the transistor 350 becomes turned on.

According to certain embodiments, the sampled difference voltage 1341 is received by a non-inverting input terminal (e.g., the "+" terminal) of the transconductance amplifier 1360. For example, the transconductance amplifier 1360 also receives a reference voltage 1361 at an inverting input terminal (e.g., the "−" terminal) of the transconductance amplifier 1360 and outputs an output current that together with the capacitor 1370 generates a voltage 1371. As an example, the voltage 1371 is generated based at least in part on the sampled difference voltage 1341 minus the reference voltage 1361. In certain examples, the comparator 1380 receives the voltage 1371 at an inverting input terminal (e.g., the "−" terminal) of the comparator 1380 and receives a ramp voltage 1381 at a non-inverting input terminal (e.g., the "+" terminal) of the comparator 1380. For example, the ramp voltage 1381 drops to its minimum value and starts ramping up when the signal 333 changes from the logic low level to the logic high level to turn on the transistor 360. In some examples, the comparator 1380 generates the comparison signal 1339 based at least in part on the voltage 1371 and the ramp voltage 1381. For example, when the ramp voltage 1381 ramps up to become larger than the voltage 1371, the comparison signal changes from the logic low level to the logic high level. As an example, the comparison 1380 is received by the logic circuits 1334 and 1338.

In some embodiments, the logic circuit 1334 receives the signal 333 and the comparison signal 1339 and generates the signal 335 based at least in part on the signal 333 and the comparison signal 1339. For example, when the signal 333 changes from a logic low level to a logic high level, the signal 335 changes from the logic low level to the logic high level in order to turn on the transistor 360. As an example, when the comparison signal 1339 changes from the logic low level to the logic high level, the signal 335 changes from the logic high level to the logic low level in order to turn off the transistor 360.

In certain embodiments, the logic circuit 1338 receives the comparison signal 1339 and the comparison signal 337 and generates the signal 351 based at least in part on the comparison signal 337 and the comparison signal 1339. For example, after a predetermined delay from the time when the comparison signal 1339 changes from the logic low level to the logic high level, the signal 351 changes from the logic low level to the logic high level in order to turn on the transistor 350. As an example, when the comparison signal 337 changes from the logic low level to the logic high level, the signal 351 changes from the logic high level to the logic low level in order to turn off the transistor 350. In some examples, after the predetermined delay from the time when the signal 335 changes from the logic high level to the logic low level in order to turn off the transistor 360, the signal 351 changes from the logic low level to the logic high level in order to turn on the transistor 350. For example, if the transistor 360 is turned off, the current 363 is prevented from flowing from the auxiliary winding 318 through the transistor 360. As an example, if the transistor 350 is turned on, the current 313 is allowed to flow from the primary winding 312 through the transistor 350.

According to some embodiments, when the signal 333 changes from the logic low level to the logic high level, the transistor 360 becomes turned on, and the transistor 360 remains turned on until the comparison signal 1339 changes from the logic low level to the logic high level. For example, when the comparison signal 1339 changes from the logic low level to the logic high level, the transistor 360 becomes turned off. As an example, during the predetermined delay from the time when the transistor 360 becomes turned off, both the transistor 360 and the transistor 350 are turned off.

According to certain embodiments, after the predetermined delay from the time when the transistor 360 becomes turned off, the transistor 350 becomes turned on. For example, after the transistor 350 becomes turned on, the transistor 350 remains turned on until the comparison signal 337 changes from the logic low level to the logic high level. As an example, when the comparison signal 337 changes from the logic low level to the logic high level, the transistor 350 becomes turned off.

As shown in FIG. 3, the integrator circuit 1350 receives the sampled difference voltage 1341 and the reference voltage 1361 and generates the voltage 1371 based at least in part on the sampled difference voltage 1341 and the reference voltage 1361 according to some embodiments. For example, the integrator circuit 1350 determines a voltage difference that is equal to the sampled difference voltage 1341 minus the reference voltage 1361 and integrate the voltage difference over time to generate the voltage 1371. As an example, the voltage 1371 is the integral of the sampled difference voltage 1341 minus the reference voltage 1361 with respect to time. As an example, the voltage 1371 is used to compare with the ramp voltage 1381 and generate the comparison signal 1339, which is used to turn off the transistor 360 without the predetermined delay and to turn on the transistor 350 with the predetermined delay.

Figure 4:
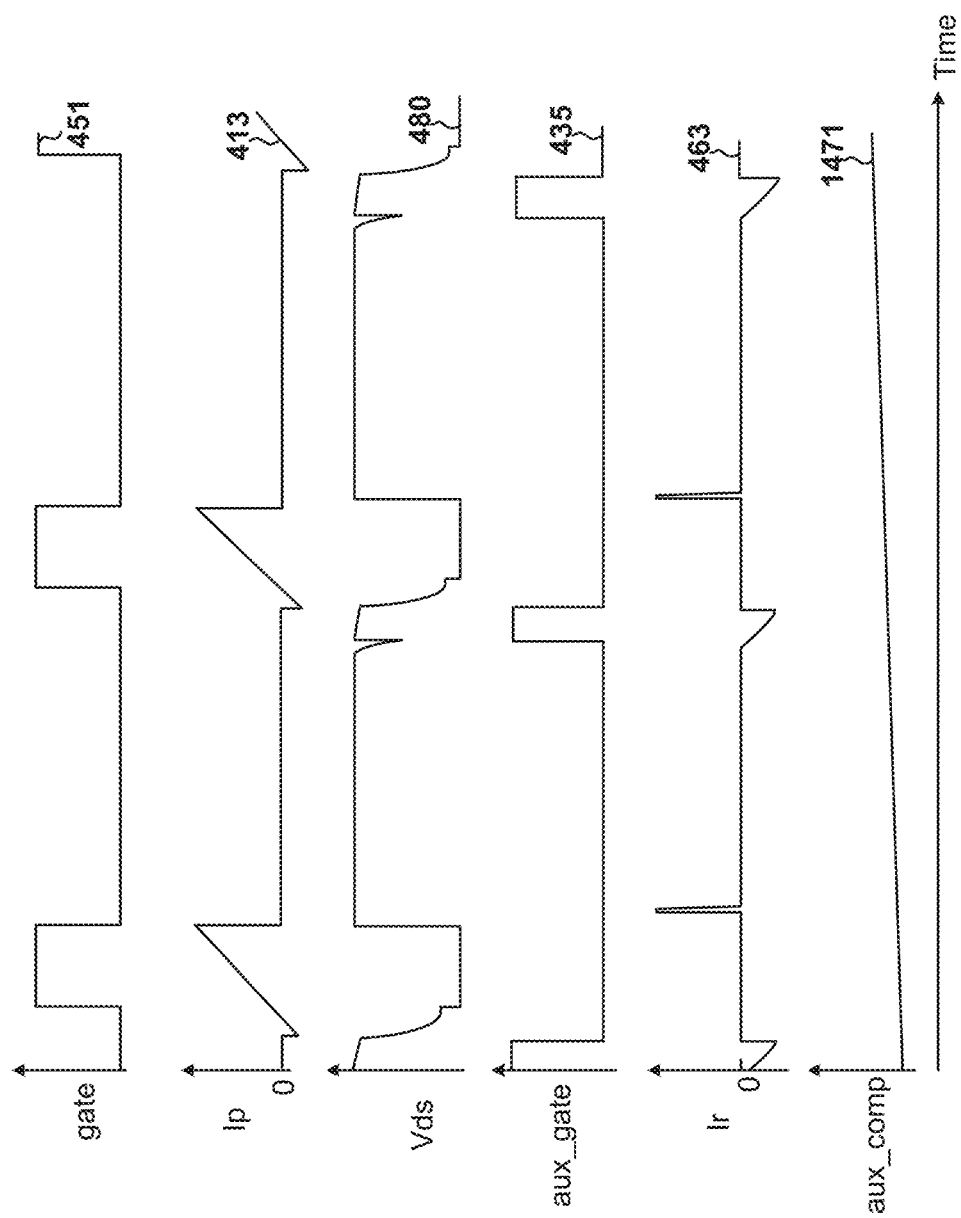
FIG. 4 shows simplified timing diagrams for the quasi-resonant switch-mode power converter as shown in FIG. 3 according to certain embodiments of the present invention.

FIG. 4 shows simplified timing diagrams for the quasi-resonant switch-mode power converter 300 as shown in FIG. 3 according to certain embodiments of the present invention. These diagrams are merely examples, which should not unduly limit the scope of the claims. One of ordinary skill in the art would recognize many variations, alternatives, and modifications. The waveform 451 represents the signal 351 as a function of time, the waveform 413 represents the current 313 as a function of time, the waveform 435 represents the signal 335 as a function of time, and the waveform 463 represents the current 363 as a function of time. Additionally, the waveform 480 represents the voltage difference from the drain terminal of the transistor 350 to the source terminal of the transistor 350 as a function of time, and the waveform 1471 represents the voltage 1371 as a function of time.

For example, as shown by the waveform 413, if the current 313 is larger than zero, the current 313 flows from the primary winding 312 to the transistor 350, and if the current 313 is smaller than zero, the current 313 flows from the transistor 350 to the primary winding 312 as shown in FIG. 3. As an example, as shown by the waveform 463, if the current 363 is larger than zero, the current 363 flows from the body diode of the transistor 360, through the auxiliary winding 318, to the capacitor 362, and if the current 363 is smaller than zero, the current 363 flows from the capacitor 362 through the auxiliary winding 318 to the transistor 360 as shown in FIG. 3.

As shown in FIG. 4, if the sampled difference voltage 1341 is larger than the reference voltage 1361, the sampled difference voltage 1341 minus the reference voltage 1361 is larger than zero and the voltage 1371, which is the integral of the sampled difference voltage 1341 minus the reference voltage 1361 with respect to time, increases with time according to some embodiments. For example, with the increasing voltage 1371, the time it takes for the ramp voltage 1381 to reach the increasing voltage 1371 from the minimum value of the ramp voltage 1381 also increases. In certain examples, with the increasing voltage 1371, the duration of time during which the comparison signal 1339 remains at the logic low level and the signal 335 remains at the logic high level also increases. In some examples, with the increasing duration of time, the sampled difference voltage 1341 decreases with time, and even though still larger than the reference voltage 1361, becomes closer to the reference voltage 1361 with time. For example, the sampled difference voltage 1341 becomes equal to the reference voltage 1361 and remains equal to the reference voltage 1361.

Figure 5:
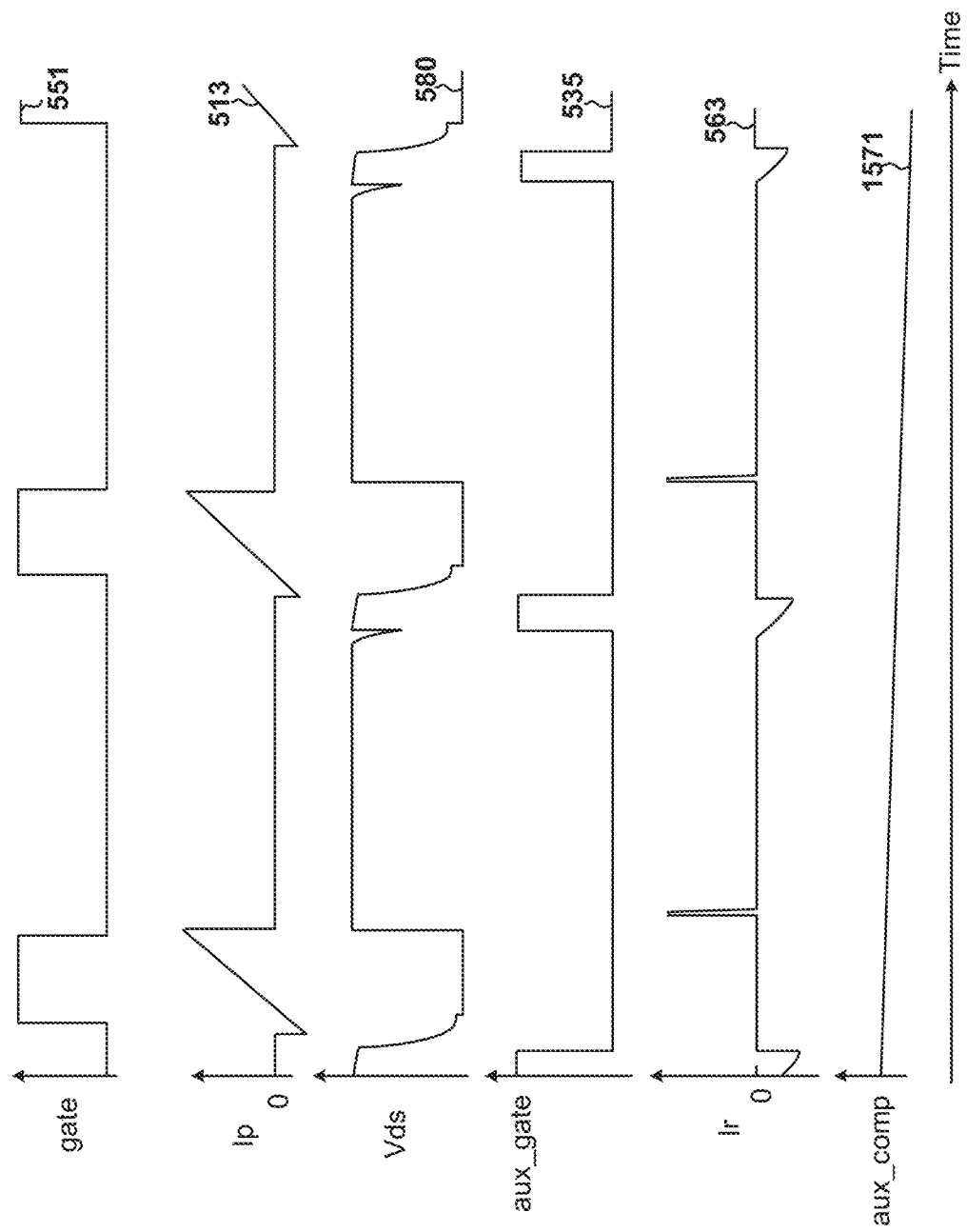
FIG. 5 shows simplified timing diagrams for the quasi-resonant switch-mode power converter as shown in FIG. 3 according to some embodiments of the present invention.

FIG. 5 shows simplified timing diagrams for the quasi-resonant switch-mode power converter 300 as shown in FIG. 3 according to some embodiments of the present invention. These diagrams are merely examples, which should not unduly limit the scope of the claims. One of ordinary skill in the art would recognize many variations, alternatives, and modifications. The waveform 551 represents the signal 351 as a function of time, the waveform 513 represents the current 313 as a function of time, the waveform 535 represents the signal 335 as a function of time, and the waveform 563 represents the current 363 as a function of time. Additionally, the waveform 580 represents the voltage difference from the drain terminal of the transistor 350 to the source terminal of the transistor 350 as a function of time, and the waveform 1571 represents the voltage 1371 as a function of time.

For example, as shown by the waveform 513, if the current 313 is larger than zero, the current 313 flows from the primary winding 312 to the transistor 350, and if the current 313 is smaller than zero, the current 313 flows from the transistor 350 to the primary winding 312 as shown in FIG. 3. As an example, as shown by the waveform 563, if the current 363 is larger than zero, the current 363 flows from the body diode of the transistor 360, through the auxiliary winding 318, to the capacitor 362, and if the current 363 is smaller than zero, the current 363 flows from the capacitor 362 through the auxiliary winding 318 to the transistor 360 as shown in FIG. 3.

As shown in FIG. 5, if the sampled difference voltage 1341 is smaller than the reference voltage 1361, the sampled difference voltage 1341 minus the reference voltage 1361 is smaller than zero and the voltage 1371, which is the integral of the sampled difference voltage 1341 minus the reference voltage 1361 with respect to time, decreases with time according to certain embodiments. For example, with the decreasing voltage 1371, the time it takes for the ramp voltage 1381 to reach the decreasing voltage 1371 from the minimum value of the ramp voltage 1381 also decreases. In certain examples, with the decreasing voltage 1371, the duration of time during which the comparison signal 1339 remains at the logic low level and the signal 335 remains at the logic high level also decreases. In some examples, with the decreasing duration of time, the sampled difference voltage 1341 increases with time, and even though still larger than the reference voltage 1361, becomes closer to the reference voltage 1361 with time. For example, the sampled difference voltage 1341 becomes equal to the reference voltage 1361 and remains equal to the reference voltage 1361.

Figure 6:
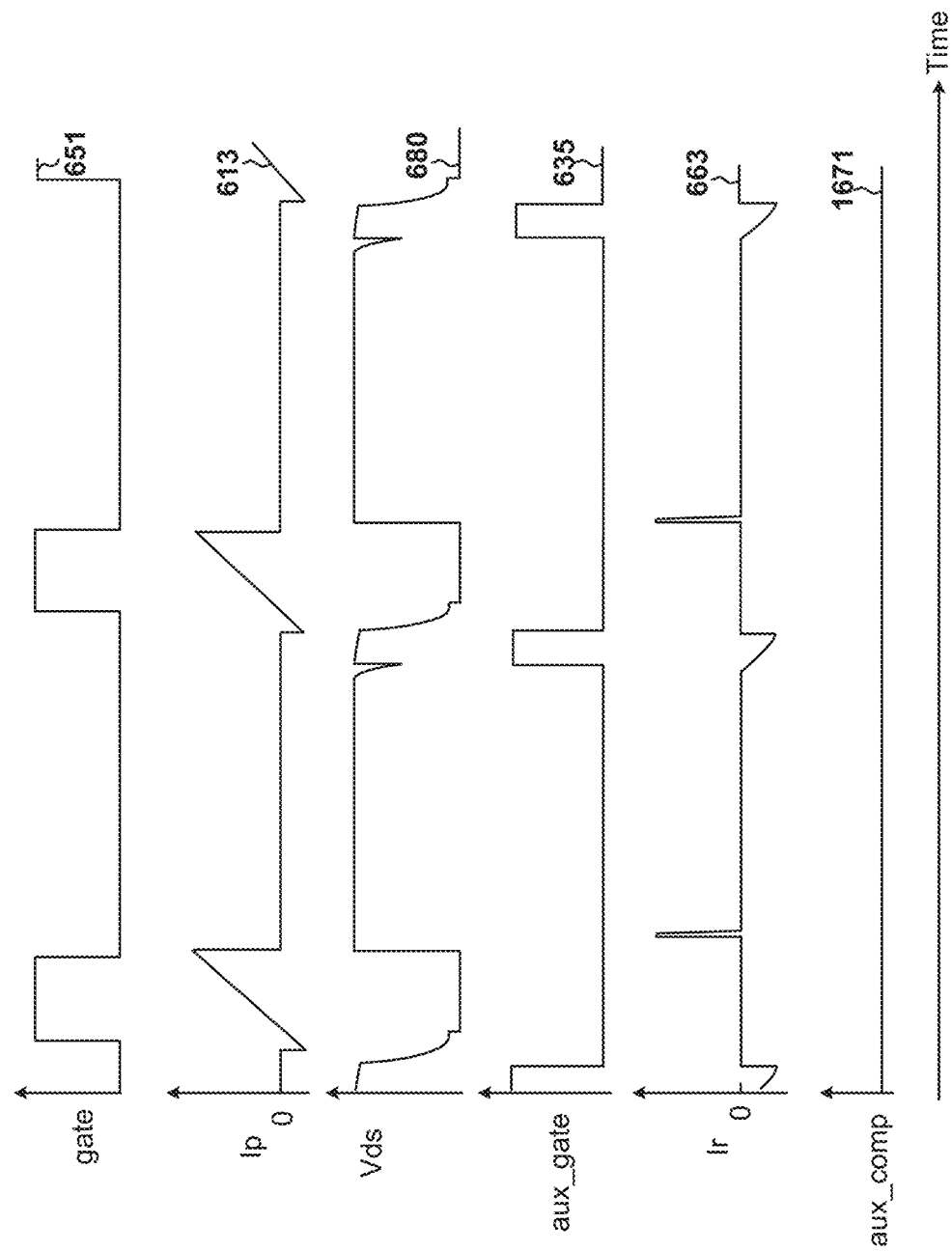
FIG. 6 shows simplified timing diagrams for the quasi-resonant switch-mode power converter as shown in FIG. 3 according to certain embodiments of the present invention.

FIG. 6 shows simplified timing diagrams for the quasi-resonant switch-mode power converter 300 as shown in FIG. 3 according to certain embodiments of the present invention. These diagrams are merely examples, which should not unduly limit the scope of the claims. One of ordinary skill in the art would recognize many variations, alternatives, and modifications. The waveform 651 represents the signal 351 as a function of time, the waveform 613 represents the current 313 as a function of time, the waveform 635 represents the signal 335 as a function of time, and the waveform 663 represents the current 363 as a function of time. Additionally, the waveform 680 represents the voltage difference from the drain terminal of the transistor 350 to the source terminal of the transistor 350 as a function of time, and the waveform 1671 represents the voltage 1371 as a function of time.

For example, as shown by the waveform 613, if the current 313 is larger than zero, the current 313 flows from the primary winding 312 to the transistor 350, and if the current 313 is smaller than zero, the current 313 flows from the transistor 350 to the primary winding 312 as shown in FIG. 3. As an example, as shown by the waveform 663, if the current 363 is larger than zero, the current 363 flows from the body diode of the transistor 360, through the auxiliary winding 318, to the capacitor 362, and if the current 363 is smaller than zero, the current 363 flows from the capacitor 362 through the auxiliary winding 318 to the transistor 360 as shown in FIG. 3.

As shown in FIG. 6, if the sampled difference voltage 1341 is equal to the reference voltage 1361, the sampled difference voltage 1341 minus the reference voltage 1361 is equal to zero and the voltage 1371, which is the integral of the sampled difference voltage 1341 minus the reference voltage 1361 with respect to time, remains constant with time according to some embodiments. For example, with the constant voltage 1371, the time it takes for the ramp voltage 1381 to reach the decreasing voltage 1371 from the minimum value of the ramp voltage 1381 also remains constant. In certain examples, with the constant voltage 1371, the duration of time during which the comparison signal 1339 remains at the logic low level and the signal 335 remains at the logic high level also remains constant. In some examples, with the constant duration of time, the sampled difference voltage 1341 remains constant with time and also remains equal to the reference voltage 1361.

Figure 7:
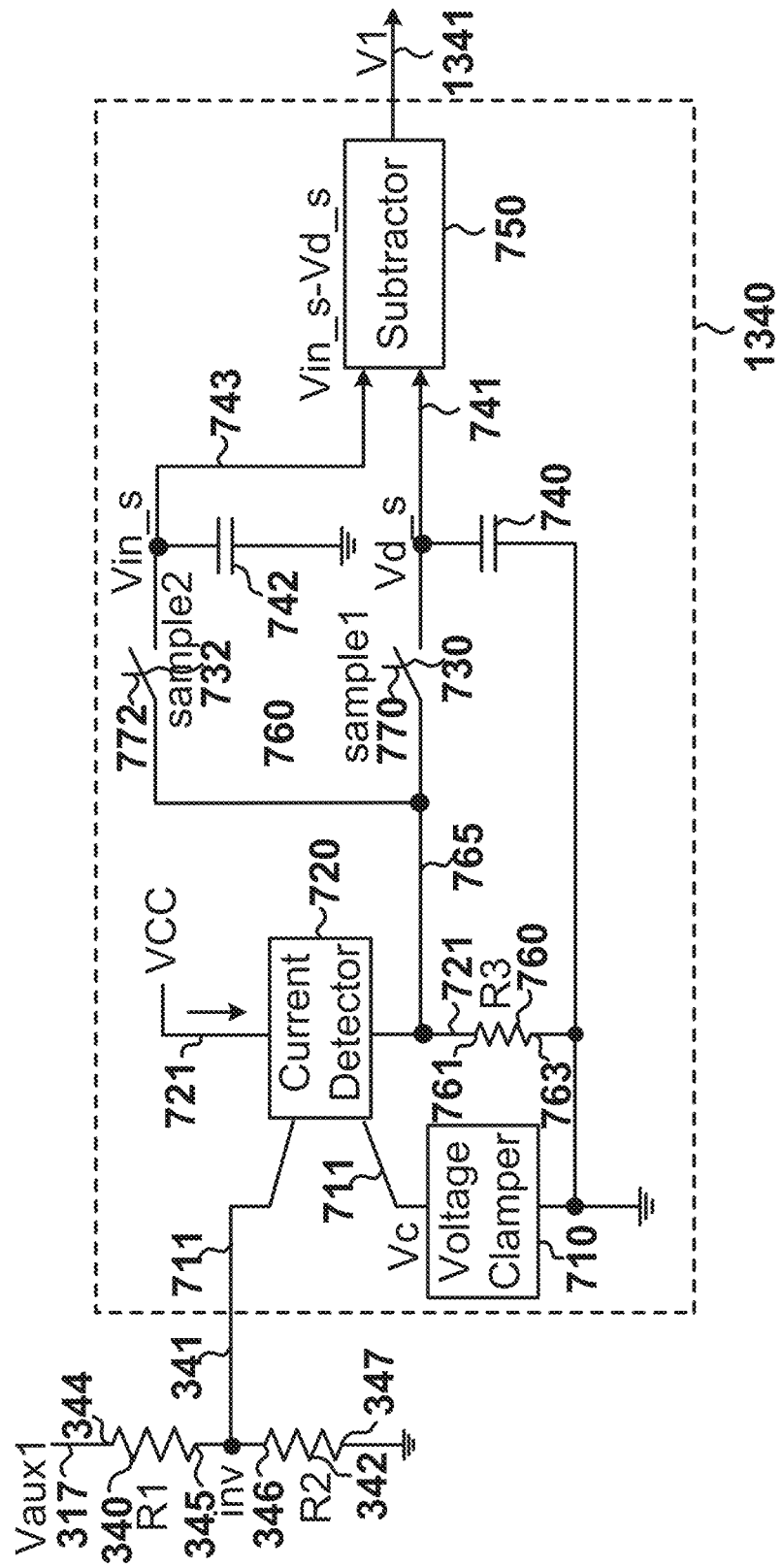
FIG. 7 is a simplified diagram showing the voltage sampling circuit as part of the quasi-resonant switch-mode power converter as shown in FIG. 3 according to certain embodiments of the present invention.

FIG. 7 is a simplified diagram showing the voltage sampling circuit 1340 as part of the quasi-resonant switch-mode power converter 300 as shown in FIG. 3 according to certain embodiments of the present invention. This diagram is merely an example, which should not unduly limit the scope of the claims. One of ordinary skill in the art would recognize many variations, alternatives, and modifications. The voltage sampling circuit 1340 includes a voltage clamper 710, a current detector 720, switches 730 and 732, capacitors 740 and 742, a subtractor 750, and a resistor 760. Although the above has been shown using a selected group of components for the voltage sampling circuit 1340, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 7, the voltage clamper 710 generates a current 711 in order to prevent the 341 from becoming smaller than a predetermined minimum (e.g., $V_c$) according to some embodiments. For example, the predetermined minimum is larger than or equal to zero volts. As an example, if the predetermined minimum is equal to the ground voltage (e.g., zero volts), when the voltage 317 is lower than the ground voltage (e.g., zero volts), the current 711 flows from the terminal 345 to the terminal 344 through the resistor 340 so that the voltage 341 remains at the ground voltage (e.g., zero volts). In certain examples, the current detector 720 detects the current 711 and generates a current 721 that is directly proportional to the current 711. For example, the current 721 is equal to the current 711 multiplied by a predetermined ratio K. In some examples, the resistor 760 includes terminals 761 and 763. For example, the terminal 761 of the resistor 760 is coupled to the current detector 720, and the terminal 763 of the resistor 760 is biased to the ground voltage. As an example, the current 721 flows from the terminal 761 to the terminal 763 in order to generate a voltage 765.

According to certain embodiments, if the predetermined minimum is equal to zero volts, when the voltage 317 is lower than zero volts, the voltage 765 is determined as follows:

$$V_{765} = \frac{-V_{317}}{R_1} \times K \times R_3 \quad \text{(Equation 1)}$$

where $V_{765}$ represents the voltage 765, and $V_{317}$ represents the voltage 317. Additionally, $R_1$ represents the resistance of the resistor 340, and $R_3$ represents the resistance of the resistor 760. Also, K represents a predetermined ratio of the current 721 to the current 711. For example, the voltage 765 is directly proportional to the absolute value of the voltage 317 if the voltage 317 is smaller than zero. As an example, the voltage 765 represents the absolute value of the voltage 317 if the voltage 317 is smaller than zero. In some examples, the voltage 317 directly proportional to the voltage difference from the drain terminal of the transistor 350 to the source terminal of the transistor 350 minus the voltage 394.

According to some embodiments, a control signal 770 is received by the switch 730 and used to close and/or open the switch 730, and a control signal 772 is received by the switch 732 and used to close and/or open the switch 732. In certain examples, immediately before the transistor 350 becomes turned on, the switch 730 is closed briefly by the control signal 770 so that the voltage 765 immediately before the transistor 350 becomes turned on is sampled and held by the capacitor 740, which outputs a sampled voltage 741. In some examples, after the transistor 350 becomes turned on but before transistor 350 becomes turned off again, the switch 732 is closed briefly by the control signal 772 so that the voltage 765 after the transistor 350 becomes turned on but before transistor 350 becomes turned off again is sampled and held by the capacitor 742, which outputs a sampled voltage 743.

In certain embodiments, the subtractor 750 receives the sampled voltage 741 and the sampled voltage 743 and generates the sampled difference voltage 1341, wherein the sampled difference voltage 1341 is equal to the sampled voltage 743 minus the sampled voltage 741. For example, the sampled difference voltage 1341 is equal to the voltage 765 after the transistor 350 becomes turned on but before transistor 350 becomes turned off again minus the voltage 765 immediately before the transistor 350 becomes turned on. In some embodiments, the sampled difference voltage 1341 represents the voltage difference from the drain terminal to the source terminal of the transistor 350 immediately before the transistor 350 becomes turned on minus the voltage difference from the drain terminal to the source terminal of the transistor 350 after the transistor 350 becomes turned on but before transistor 350 becomes turned off again. For example, the voltage difference from the drain terminal to the source terminal of the transistor 350 after the transistor 350 becomes turned on but before transistor 350 becomes turned off again is equal to zero volts, and the sampled difference voltage 1341 represents the voltage difference from the drain terminal to the source terminal of the transistor 350 immediately before the transistor 350 becomes turned on.

As shown in FIG. 3, the sampled difference voltage 1341 is adjusted to become equal to the reference voltage 1361 and then remains equal to the reference voltage 1361 according to some embodiments. In certain examples, if the sampled difference voltage 1341 is equal to the reference voltage 1361, the voltage difference from the drain terminal to the source terminal of the transistor 350 immediately before the transistor 350 becomes turned on minus the voltage difference from the drain terminal to the source terminal of the transistor 350 after the transistor 350 becomes turned on but before transistor 350 becomes turned off again is determined as follows:

$$V_{ds\_1} - V_{ds\_2} = \frac{N_p}{N_{aux1}} \times \left( \frac{R_1 \times V_{ref}}{K \times R_3} - V_c \right) \quad \text{(Equation 2)}$$

where $V_{ds\_1}$ represents the voltage difference from the drain terminal to the source terminal of the transistor 350 immediately before the transistor 350 becomes turned on, and $V_{ds\_2}$ represents the voltage difference from the drain terminal to the source terminal of the transistor 350 after the transistor 350 becomes turned on but before transistor 350 becomes turned off again. Additionally, $N_p$ represents the number of turns of the primary winding 312, and $N_{aux1}$ represents the number of turns of the auxiliary winding 316. Moreover, $R_1$ represents the resistance of the resistor 340, and $R_3$ represents the resistance of the resistor 760. Also, $V_{ref}$ represents the reference voltage 1361, and $V_c$ represents the predetermined minimum used by the voltage clamper 710. Additionally, K represents a predetermined ratio of the current 721 to the current 711. For example, $V_{ds\_2}$ is equal to zero volts.

For example, the voltage difference from the drain terminal to the source terminal of the transistor 350 after the transistor 350 becomes turned on but before transistor 350 becomes turned off again is equal to zero, so if the sampled difference voltage 1341 is equal to the reference voltage 1361, the voltage difference from the drain terminal to the source terminal of the transistor 350 immediately before the transistor 350 becomes turned on is determined as follows:

$$V_{ds\_1} = \frac{N_p}{N_{aux1}} \times \left( \frac{R_1 \times V_{ref}}{K \times R_3} - V_c \right) \quad \text{(Equation 3)}$$

where $V_{ds\_1}$ represents the voltage difference from the drain terminal to the source terminal of the transistor 350 immediately before the transistor 350 becomes turned on. Additionally, $N_p$ represents the number of turns of the primary winding 312, and $N_{aux1}$ represents the number of turns of the auxiliary winding 316. Moreover, $R_1$ represents the resistance of the resistor 340, and $R_3$ represents the resistance of the resistor 760. Also, $V_{ref}$ represents the reference voltage 1361, and $V_c$ represents the predetermined minimum used by the voltage clamper 710. Additionally, K represents a predetermined ratio of the current 721 to the current 711.

As an example, the voltage difference from the drain terminal to the source terminal of the transistor 350 after the transistor 350 becomes turned on but before transistor 350 becomes turned off again is equal to zero and the predetermined minimum used by the voltage clamper 710 is also equal to zero, so if the sampled difference voltage 1341 is equal to the reference voltage 1361, the voltage difference from the drain terminal to the source terminal of the transistor 350 immediately before the transistor 350 becomes turned on is determined as follows:

$$V_{ds\_1} = \frac{N_p}{N_{aux1}} \times \frac{R_1 \times V_{ref}}{K \times R_3} \quad \text{(Equation 4)}$$

where $V_{ds\_1}$ represents the voltage difference from the drain terminal to the source terminal of the transistor 350 immediately before the transistor 350 becomes turned on. Additionally, $N_p$ represents the number of turns of the primary winding 312, and $N_{aux1}$ represents the number of turns of the auxiliary winding 316. Moreover, $R_1$ represents the resistance of the resistor 340, and $R_3$ represents the resistance of the resistor 760. Also, $V_{ref}$ represents the reference voltage 1361, and K represents a predetermined ratio of the current 721 to the current 711. As shown by Equation 4, $V_{ds\_1}$ changes with $R_1$ according to certain embodiments.

Figure 8:
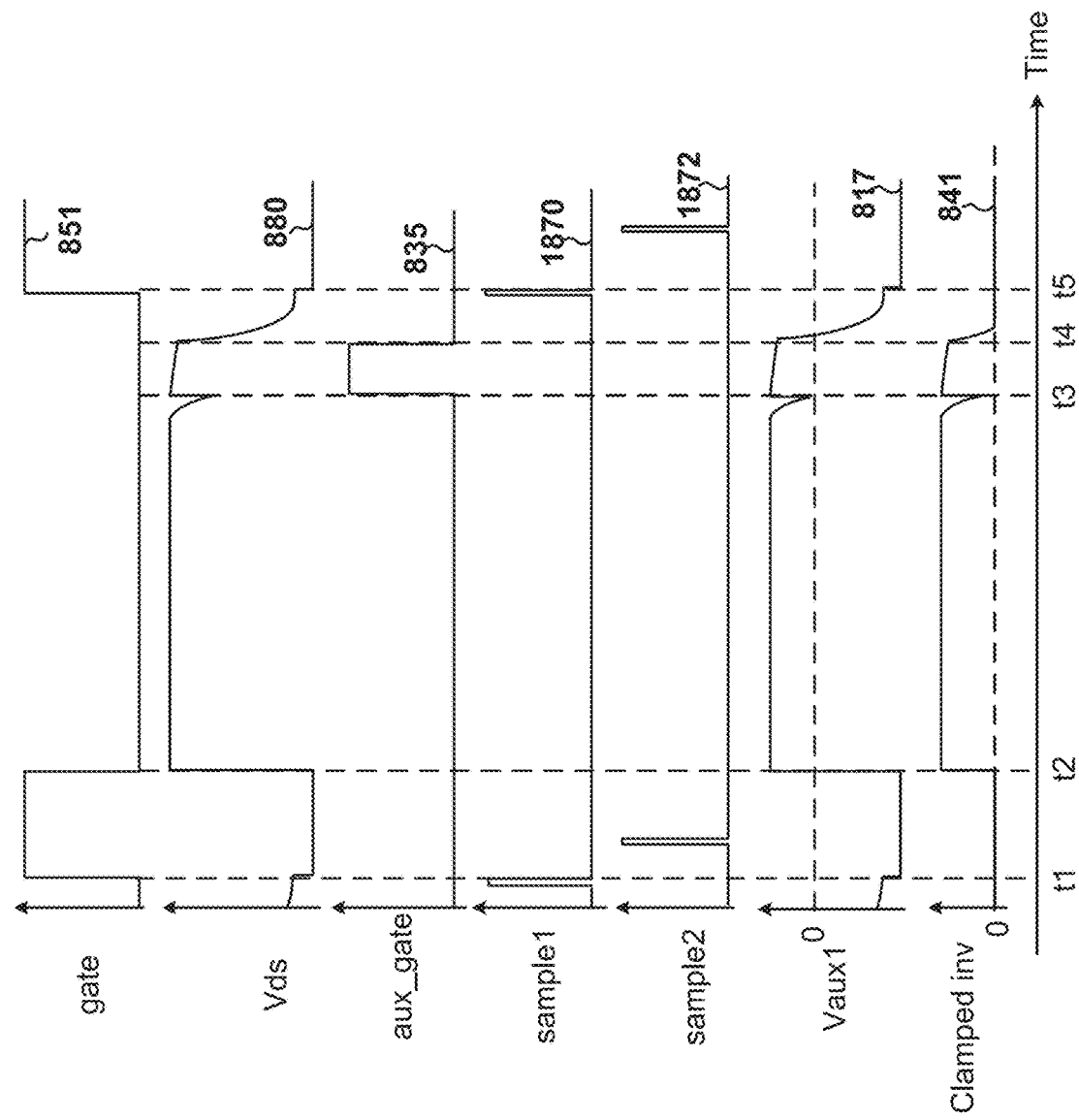
FIG. 8 shows simplified timing diagrams for the quasi-resonant switch-mode power converter as shown in FIG. 3 and FIG. 7 according to some embodiments of the present invention.

FIG. 8 shows simplified timing diagrams for the quasi-resonant switch-mode power converter 300 as shown in FIG. 3 and FIG. 7 according to some embodiments of the present invention. These diagrams are merely examples, which should not unduly limit the scope of the claims. One of ordinary skill in the art would recognize many variations, alternatives, and modifications. The waveform 851 represents the signal 351 as a function of time, the waveform 880 represents the voltage difference from the drain terminal of the transistor 350 to the source terminal of the transistor 350 as a function of time, and the waveform 835 represents the signal 335 as a function of time. Additionally, the waveform 1870 represents the control signal 770 as a function of time, and the waveform 1872 represents the control signal 772 as a function of time. Also, the waveform 817 represents the voltage 317 as a function of time, and the waveform 841 represents the voltage 341 as a function of time.

For example, as shown by the waveform 851, if the signal 351 is at the logic high level, the transistor 350 is turned on, and if the signal 351 is at the logic low level, the transistor 350 is turned off, and as shown by the waveform 835, if the signal 335 is at the logic high level, the transistor 360 is turned on, and if the signal 335 is at the logic low level, the transistor 360 is turned off. As an example, as shown by the waveform 1870, if the control signal 770 is at the logic high level, the switch 730 is closed, and if the control signal 770 is at the logic low level, the switch 730 is open, and as shown by the waveform 1872, if the control signal 772 is at the logic high level, the switch 732 is closed, and if the control signal 772 is at the logic low level, the switch 732 is open. For example, as shown in FIG. 3, the demagnetization detector 332 uses the voltage 341 as shown by the waveform 841 to detect the end of the demagnetization process of the secondary winding 314.

As shown by the waveforms 817 and 835, after the transistor 360 becomes turned off, the voltage 317 of the auxiliary winding 316 becomes lower than 0 volts during resonance according to certain embodiments. In some examples, the voltage 317 is directly proportional to the voltage difference from the drain terminal of the transistor 350 to the source terminal of the transistor 350 minus the voltage 394. In certain examples, the voltage 341 is proportional to the voltage 317, except that the voltage 341 is prevented from becoming smaller than the predetermined minimum (e.g., $V_c$). For example, the predetermined minimum is larger than or equal to zero volts. As an example, the predetermined minimum is equal to the ground voltage (e.g., zero volts).

In some embodiments, as shown by the waveforms 851 and 1870, the control signal 770 includes a pulse immediately before the transistor 350 becomes turned on. For example, during this pulse of the control signal 770, the switch 730 is closed briefly by the control signal 770 so that the voltage 765 immediately before the transistor 350 becomes turned on is sampled and held by the capacitor 740. As an example, the sampled voltage 741 represents the voltage 765 immediately before the transistor 350 becomes turned on. In certain embodiments, as shown by the waveforms 851 and 1872, the control signal 772 includes a pulse after the transistor 350 becomes turned on but before transistor 350 becomes turned off again. For example, during this pulse of the control signal 772, the switch 732 is closed briefly by the control signal 772 so that the voltage 765 after the transistor 350 becomes turned on but before transistor 350 becomes turned off again is sampled and held by the capacitor 742. As an example, the sampled voltage 743 represents the voltage 765 after the transistor 350 becomes turned on but before transistor 350 becomes turned off again.

In certain embodiments, as shown by the waveforms 851 and 835, the signal 351 changes from the logic low level to the logic high level at time $t_1$, the signal 351 changes from the logic high level to the logic low level at time $t_2$, the signal 335 changes from the logic low level to the logic high level at time $t_3$, the signal 335 changes from the logic high level to the logic low level at time U, and the signal 351 changes from the logic low level to the logic high level at time $t_5$. In some examples, the transistor 350 becomes turned on at time $t_1$, the transistor 350 becomes turned off at time $t_2$, the transistor 360 becomes turned on at time $t_3$, the transistor 360 becomes turned off at time $t_4$, and the transistor 350 becomes turned on at time $t_5$. For example, time $t_1$ is before time $t_2$, time $t_2$ is before time $t_3$, time $t_3$ is before time $t_4$, and time $t_4$ is before time $t_5$. As an example, time $t_5$ is after time $t_4$ by the predetermined delay.

According to some embodiments, the voltage sampling circuit 1340 generates the sampled difference voltage 1341, which is directly proportional to the voltage difference from the drain terminal to the source terminal of the transistor 350 immediately before the transistor 350 becomes turned on at time $t_1$ minus the voltage difference from the drain terminal to the source terminal of the transistor 350 after the transistor 350 becomes turned on at time $t_1$ but before the transistor 350 becomes turned off again at time $t_2$. For example, the voltage difference from the drain terminal to the source terminal of the transistor 350 after the transistor 350 becomes turned on at time $t_1$ but before the transistor 350 becomes turned off again at time $t_2$ is equal to zero volts, the sampled difference voltage 1341 is directly proportional to the voltage difference from the drain terminal to the source terminal of the transistor 350 immediately before the transistor 350 becomes turned on at time $t_1$.

According to certain embodiments, the integrator circuit 1350 receives the sampled difference voltage 1341 and the reference voltage 1361 and generates the voltage 1371 based at least in part on the sampled difference voltage 1341 and the reference voltage 1361. For example, if the sampled difference voltage 1341 is larger than the reference voltage 1361, the voltage 1371 increases. As an example, if the sampled difference voltage 1341 is smaller than the reference voltage 1361, the voltage 1371 decreases. For example, if the sampled difference voltage 1341 is equal to the reference voltage 1361, the voltage 1371 remains unchanged.

In some embodiments, the voltage 1371, which has been increased, decreased, and/or kept constant, is used by the comparator 1380 to generate the comparison signal 1339. For example, at time $t_4$, the comparison signal 1339 changes from the logic low level to the logic high level, causing the signal 335 to change from the logic high level to the logic low level at time $t_4$ to turn off the transistor 360. As an example, at time $t_5$, which is after time $t_4$ by the predetermined delay, the signal 351 changes from the logic low level to the logic high level to turn on the transistor 350.

Certain embodiments of the present invention provide a control system and method for turning on a transistor associated with a primary winding, wherein immediately before the transistor becomes turned on, a voltage difference from a drain terminal to a source terminal of the transistor is equal to a pre-determined voltage level. For example, the pre-determined voltage level (e.g., $V_{ds\_1}$) is set as shown by Equation 4, and the pre-determined voltage level (e.g., $V_{ds\_1}$) depends on at least the resistance of the resistor 340. As an example, the pre-determined voltage level (e.g., $V_{ds\_1}$) is set to a value (e.g., 50 volts) to improve (e.g., maximize) the efficiency of a switch-mode power converter (e.g., the quasi-resonant switch-mode power converter 300).

According to some embodiments, a system for controlling turning on a first transistor and turning off a second transistor includes: a logic signal generator configured to: process information associated with a first voltage related to a second voltage of a first auxiliary winding, the first auxiliary winding being coupled to a primary winding, a secondary winding, and a second auxiliary winding; generate a third voltage based on at least information associated with the first voltage, the third voltage indicating a first voltage difference from a drain terminal to a source terminal of a first transistor related to the primary winding; process information associated with the third voltage and a reference voltage; and change a logic signal from a first logic level to a second logic level based at least in part on the second voltage and the reference voltage; and a drive signal generator configured to: receive the logic signal; and in response to the logic signal changing from the first logic level to the second logic level, change, at a first time, a first drive signal to turn off a second transistor related to the second auxiliary winding; and change, at a second time, a second drive signal to turn on the first transistor related to the primary winding, the second time being after the first time by a predetermined delay. For example, the system is implemented according to at least FIG. 3.

As an example, the third voltage is directly proportional to the first voltage difference from the drain terminal to the source terminal of the first transistor. For example, the logic signal generator is further configured to generate the third voltage indicating the first voltage difference from the drain terminal to the source terminal of the first transistor immediately before the first transistor becomes turned on at a third time; wherein: at the third time, the first transistor becomes turned on previously; and at the second time, the first transistor becomes turned on again; wherein the third time is before the second time. For example, the third time is before the first time, and the first time is before the second time. As an example, the logic signal generator is further configured to: determine a second voltage difference equal to the third voltage minus the reference voltage; and generate a fourth voltage based at least in part on the second voltage difference. As an example, the logic signal generator is further configured to: if the third voltage is larger than the reference voltage, increase the fourth voltage; and if the third voltage is smaller than the reference voltage, decrease the fourth voltage. For example, the logic signal generator is further configured to, if the third voltage is equal to the reference voltage, keep the fourth voltage constant.

As an example, the logic signal generator is further configured to: process information associated with the fourth voltage and a ramp voltage; and change the logic signal from the first logic level to the second logic level based at least in part on the fourth voltage and the ramp voltage. For example, the logic signal generator is further configured to: compare the fourth voltage and the ramp voltage; and change the logic signal from the first logic level to the second logic level if the ramp voltage becomes larger than the fourth voltage. As an example, the first logic level is a logic low level; and the second logic level is a logic high level.

For example, the drive signal generator is further configured to, in response to the logic signal changing from the first logic level to the second logic level, change, at the first time, the first drive signal from the second logic level to the first logic level to turn off the second transistor; and change, at the second time, the second drive signal from the first logic level to the second logic level to turn on the first transistor, the second time being after the first time by the predetermined delay. As an example, the first logic level is a logic low level; and the second logic level is a logic high level. For example, the drive signal generator is further configured to, in response to the logic signal changing from the first logic level to the second logic level, change, at the first time, the first drive signal to turn off the second transistor to prevent a current from flowing from the second auxiliary winding through the second transistor; and change, at the second time, the second drive signal to turn on the first transistor to allow a current to flow from the primary winding through the first transistor.

As an example, the system further includes a demagnetization detector configured to: process information associated with the first voltage related to the second voltage of the first auxiliary winding; and generate a detection signal based on at least information associated with the first voltage. For example, the drive signal generator is further configured to: receive the detection signal; and if the detection signal indicates an end of a demagnetization process related to the secondary winding, change the first drive signal to turn on the second transistor related to the second auxiliary winding. As an example, the system further includes a comparator configured to: receive a feedback voltage and a sensing voltage, the feedback voltage being related to an output voltage associated with the secondary winding, the sensing voltage being related to a current flowing through the primary winding; and generate a comparison signal based at least in part on the feedback voltage and the sensing voltage. For example, the drive signal generator is further configured to: receive the comparison signal; and if the comparison signal indicates that the sensing voltage becomes larger than the feedback voltage, change the second drive signal to turn off the first transistor related to the primary winding.

According to some embodiments, a method for controlling turning on a first transistor and turning off a second transistor includes: processing information associated with a first voltage related to a second voltage of a first auxiliary winding, the first auxiliary winding being coupled to a primary winding, a secondary winding, and a second auxiliary winding; generating a third voltage based on at least information associated with the first voltage, the third voltage indicating a first voltage difference from a drain terminal to a source terminal of a first transistor related to the primary winding; processing information associated with the third voltage and a reference voltage; changing a logic signal from a first logic level to a second logic level based at least in part on the second voltage and the reference voltage; receiving the logic signal; and in response to the logic signal changing from the first logic level to the second logic level, changing, at a first time, a first drive signal to turn off a second transistor related to the second auxiliary winding; and changing, at a second time, a second drive signal to turn on the first transistor related to the primary winding, the second time being after the first time by a predetermined delay. For example, the method is implemented according to at least FIG. 3.

As an example, the third voltage is directly proportional to the first voltage difference from the drain terminal to the source terminal of the first transistor. For example, the generating a third voltage based on at least information associated with the first voltage includes: generating the third voltage indicating the first voltage difference from the drain terminal to the source terminal of the first transistor immediately before the first transistor becomes turned on at a third time; wherein: at the third time, the first transistor becomes turned on previously; and at the second time, the first transistor becomes turned on again; wherein the third time is before the second time. As an example, the third time is before the first time, and the first time is before the second time.

For example, the processing information associated with the third voltage and a reference voltage includes: determining a second voltage difference equal to the third voltage minus the reference voltage; and generating a fourth voltage based at least in part on the second voltage difference. As an example, the generating a fourth voltage based at least in part on the second voltage difference includes: if the third voltage is larger than the reference voltage, increasing the fourth voltage; and if the third voltage is smaller than the reference voltage, decreasing the fourth voltage. For example, the generating a fourth voltage based at least in part on the second voltage difference further includes: if the third voltage is equal to the reference voltage, keeping the fourth voltage constant.

As an example, the changing a logic signal from a first logic level to a second logic level based at least in part on the second voltage and the reference voltage includes: processing information associated with the fourth voltage and a ramp voltage; and changing the logic signal from the first logic level to the second logic level based at least in part on the fourth voltage and the ramp voltage. For example, the processing information associated with the fourth voltage and a ramp voltage includes: comparing the fourth voltage and the ramp voltage; the changing the logic signal from the first logic level to the second logic level based at least in part on the fourth voltage and the ramp voltage includes: changing the logic signal from the first logic level to the second logic level if the ramp voltage becomes larger than the fourth voltage. As an example, the first logic level is a logic low level; and the second logic level is a logic high level.

For example, the changing, at a first time, a first drive signal to turn off a second transistor related to the second auxiliary winding in response to the logic signal changing from the first logic level to the second logic level includes: changing, at the first time, the first drive signal from the second logic level to the first logic level to turn off the second transistor in response to the logic signal changing from the first logic level to the second logic level. As an example, the changing, at a second time, a second drive signal to turn on the first transistor related to the primary winding in response to the logic signal changing from the first logic level to the second logic level includes: changing, at the second time, the second drive signal from the first logic level to the second logic level to turn on the first transistor in response to the logic signal changing from the first logic level to the second logic level. For example, the first logic level is a logic low level; and the second logic level is a logic high level.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for controlling turning on a first transistor and turning off a second transistor, the system comprising:
    a logic signal generator configured to:
        process information associated with a first voltage related to a second voltage of a first auxiliary winding, the first auxiliary winding being coupled to a primary winding, a secondary winding, and a second auxiliary winding;
        generate a third voltage based on at least information associated with the first voltage, the third voltage indicating a first voltage difference from a drain terminal to a source terminal of a first transistor related to the primary winding;
        process information associated with the third voltage and a reference voltage; and
        change a logic signal from a first logic level to a second logic level based at least in part on the second voltage and the reference voltage; and
    a drive signal generator configured to:
        receive the logic signal; and
        in response to the logic signal changing from the first logic level to the second logic level,
            change, at a first time, a first drive signal to turn off a second transistor related to the second auxiliary winding; and
            change, at a second time, a second drive signal to turn on the first transistor related to the primary winding, the second time being after the first time by a predetermined delay.

2. The system of claim 1 wherein the third voltage is directly proportional to the first voltage difference from the drain terminal to the source terminal of the first transistor.

3. The system of claim 1 wherein:
    the logic signal generator is further configured to generate the third voltage indicating the first voltage difference from the drain terminal to the source terminal of the first transistor immediately before the first transistor becomes turned on at a third time;
    wherein:
        at the third time, the first transistor becomes turned on previously; and
        at the second time, the first transistor becomes turned on again;
    wherein the third time is before the second time.

4. The system of claim 3 wherein the third time is before the first time, and the first time is before the second time.

5. The system of claim 1 wherein the logic signal generator is further configured to:
    determine a second voltage difference equal to the third voltage minus the reference voltage; and
    generate a fourth voltage based at least in part on the second voltage difference.

6. The system of claim 5 wherein the logic signal generator is further configured to:
    if the third voltage is larger than the reference voltage, increase the fourth voltage; and
    if the third voltage is smaller than the reference voltage, decrease the fourth voltage.

7. The system of claim 6 wherein the logic signal generator is further configured to, if the third voltage is equal to the reference voltage, keep the fourth voltage constant.

8. The system of claim 5 wherein the logic signal generator is further configured to:
    process information associated with the fourth voltage and a ramp voltage; and
    change the logic signal from the first logic level to the second logic level based at least in part on the fourth voltage and the ramp voltage.

9. The system of claim 8 wherein the logic signal generator is further configured to:
    compare the fourth voltage and the ramp voltage; and
    change the logic signal from the first logic level to the second logic level if the ramp voltage becomes larger than the fourth voltage.

10. The system of claim 9 wherein:
    the first logic level is a logic low level; and
    the second logic level is a logic high level.

11. The system of claim 1 wherein the drive signal generator is further configured to, in response to the logic signal changing from the first logic level to the second logic level,
    change, at the first time, the first drive signal from the second logic level to the first logic level to turn off the second transistor; and
    change, at the second time, the second drive signal from the first logic level to the second logic level to turn on the first transistor, the second time being after the first time by the predetermined delay.

12. The system of claim 11 wherein:
    the first logic level is a logic low level; and
    the second logic level is a logic high level.

13. The system of claim 1 wherein the drive signal generator is further configured to, in response to the logic signal changing from the first logic level to the second logic level,
    change, at the first time, the first drive signal to turn off the second transistor to prevent a current from flowing from the second auxiliary winding through the second transistor; and
    change, at the second time, the second drive signal to turn on the first transistor to allow a current to flow from the primary winding through the first transistor.

14. The system of claim 1, and further comprising a demagnetization detector configured to:
process information associated with the first voltage related to the second voltage of the first auxiliary winding; and
generate a detection signal based on at least information associated with the first voltage.

15. The system of claim 14 wherein the drive signal generator is further configured to:
receive the detection signal; and
if the detection signal indicates an end of a demagnetization process related to the secondary winding, change the first drive signal to turn on the second transistor related to the second auxiliary winding.

16. The system of claim 1, and further comprising a comparator configured to:
receive a feedback voltage and a sensing voltage, the feedback voltage being related to an output voltage associated with the secondary winding, the sensing voltage being related to a current flowing through the primary winding; and
generate a comparison signal based at least in part on the feedback voltage and the sensing voltage.

17. The system of claim 16 wherein the drive signal generator is further configured to:
receive the comparison signal; and
if the comparison signal indicates that the sensing voltage becomes larger than the feedback voltage, change the second drive signal to turn off the first transistor related to the primary winding.

18. A method for controlling turning on a first transistor and turning off a second transistor, the method comprising:
processing information associated with a first voltage related to a second voltage of a first auxiliary winding, the first auxiliary winding being coupled to a primary winding, a secondary winding, and a second auxiliary winding;
generating a third voltage based on at least information associated with the first voltage, the third voltage indicating a first voltage difference from a drain terminal to a source terminal of a first transistor related to the primary winding;
processing information associated with the third voltage and a reference voltage;
changing a logic signal from a first logic level to a second logic level based at least in part on the second voltage and the reference voltage;
receiving the logic signal; and
in response to the logic signal changing from the first logic level to the second logic level,
changing, at a first time, a first drive signal to turn off a second transistor related to the second auxiliary winding; and
changing, at a second time, a second drive signal to turn on the first transistor related to the primary winding, the second time being after the first time by a predetermined delay.

19. The method of claim 18 wherein the third voltage is directly proportional to the first voltage difference from the drain terminal to the source terminal of the first transistor.

20. The method of claim 18 wherein the generating a third voltage based on at least information associated with the first voltage includes:
generating the third voltage indicating the first voltage difference from the drain terminal to the source terminal of the first transistor immediately before the first transistor becomes turned on at a third time;
wherein:
at the third time, the first transistor becomes turned on previously; and
at the second time, the first transistor becomes turned on again;
wherein the third time is before the second time.

21. The method of claim 20 wherein the third time is before the first time, and the first time is before the second time.

22. The method of claim 18 wherein the processing information associated with the third voltage and a reference voltage includes:
determining a second voltage difference equal to the third voltage minus the reference voltage; and
generating a fourth voltage based at least in part on the second voltage difference.

23. The method of claim 22 wherein the generating a fourth voltage based at least in part on the second voltage difference includes:
if the third voltage is larger than the reference voltage, increasing the fourth voltage; and
if the third voltage is smaller than the reference voltage, decreasing the fourth voltage.

24. The method of claim 23 wherein the generating the fourth voltage based at least in part on the second voltage difference further includes:
if the third voltage is equal to the reference voltage, keeping the fourth voltage constant.

25. The method of claim 22 wherein the changing the logic signal from the first logic level to the second logic level based at least in part on the second voltage and the reference voltage includes:
processing information associated with the fourth voltage and a ramp voltage; and
changing the logic signal from the first logic level to the second logic level based at least in part on the fourth voltage and the ramp voltage.

26. The method of claim 25 wherein:
the processing information associated with the fourth voltage and the ramp voltage includes:
comparing the fourth voltage and the ramp voltage;
the changing the logic signal from the first logic level to the second logic level based at least in part on the fourth voltage and the ramp voltage includes:
changing the logic signal from the first logic level to the second logic level if the ramp voltage becomes larger than the fourth voltage.

27. The method of claim 26 wherein:
the first logic level is a logic low level; and
the second logic level is a logic high level.

28. The method of claim 18 wherein the changing, at the first time, the first drive signal to turn off the second transistor related to the second auxiliary winding in response to the logic signal changing from the first logic level to the second logic level includes:
changing, at the first time, the first drive signal from the second logic level to the first logic level to turn off the second transistor in response to the logic signal changing from the first logic level to the second logic level.

29. The method of claim 28 wherein the changing, at the second time, the second drive signal to turn on the first transistor related to the primary winding in response to the logic signal changing from the first logic level to the second logic level includes:
changing, at the second time, the second drive signal from the first logic level to the second logic level to turn on the first transistor in response to the logic signal changing from the first logic level to the second logic level.

30. The method of claim 29 wherein:
the first logic level is a logic low level; and
the second logic level is a logic high level.

* * * * *